United States Patent [19]

Martinez

[11] Patent Number: 5,101,973
[45] Date of Patent: Apr. 7, 1992

[54] COMPACT DISC CASE AND BLANK FOR FORMING SAME

[76] Inventor: Samantha Martinez, 1660 Sunset Plaza Dr., Los Angeles, Calif. 90069

[21] Appl. No.: 501,669

[22] Filed: Mar. 29, 1990

[51] Int. Cl.$^5$ .............................................. B65D 85/57
[52] U.S. Cl. .................................................... 206/312
[58] Field of Search ............... 206/307, 309, 310, 311, 206/312, 313, 444

[56] References Cited

U.S. PATENT DOCUMENTS

| | | | |
|---|---|---|---|
| 174,940 | 3/1876 | Brown | 229/68 |
| 1,292,264 | 1/1919 | Coulson | 229/68 |
| 2,189,076 | 2/1940 | Liskin | 206/309 |
| 3,005,544 | 10/1961 | Chaplin | 206/313 |
| 3,102,635 | 9/1963 | Werwin | 206/313 |
| 3,426,960 | 2/1969 | Shore | 206/312 |
| 3,595,383 | 7/1971 | Boylan | 206/312 |
| 4,339,034 | 7/1982 | Panveno | 206/313 |
| 4,411,360 | 10/1983 | Gardineer | 206/444 |
| 4,413,298 | 11/1983 | Pecsok | 206/313 |
| 4,473,153 | 9/1984 | Colangelo | 206/312 |
| 4,620,630 | 11/1986 | Moss | 206/313 |
| 4,709,812 | 12/1987 | Kosterka | 206/310 |
| 4,850,731 | 7/1989 | Youngs | 206/313 |

FOREIGN PATENT DOCUMENTS

| | | | |
|---|---|---|---|
| 350525 | 3/1922 | Fed. Rep. of Germany | 206/309 |
| 1213757 | 11/1959 | France | 206/309 |
| 8702565 | 5/1989 | Netherlands | 206/444 |
| 2147262 | 5/1985 | United Kingdom | 206/307 |

Primary Examiner—William I. Price
Attorney, Agent, or Firm—Poms, Smith, Lande & Rose

[57] ABSTRACT

A compact disc case and blank for forming the same. The case includes a pocket inside of an envelope for holding a compact disc. A cut-out portion provides easy grasping of the disc to permit removal and insertion into the case. A flap folds over the cut-out portion providing a closable case for holding and storing the disc. The flap has a detachable folded portion which can be used to place a mailing label on, then folded over and about the case and sealed to provide a mailing container. The folding portion can then be detached and the case is used to permanently store the disc.

1 Claim, 2 Drawing Sheets

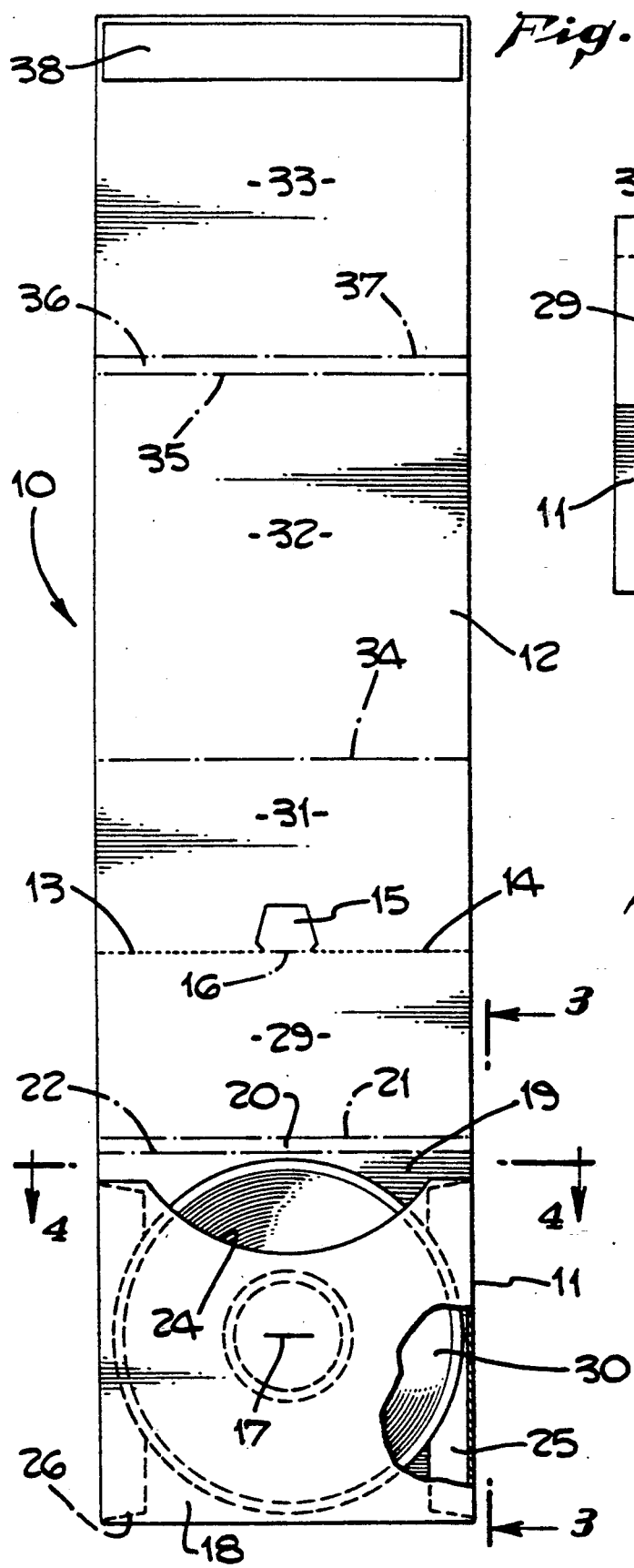
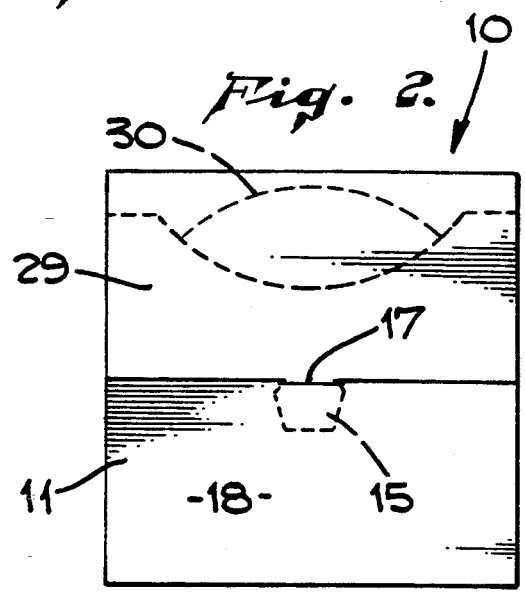
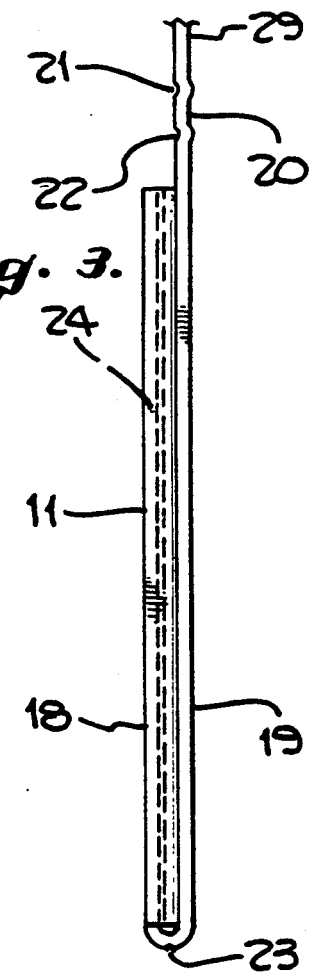

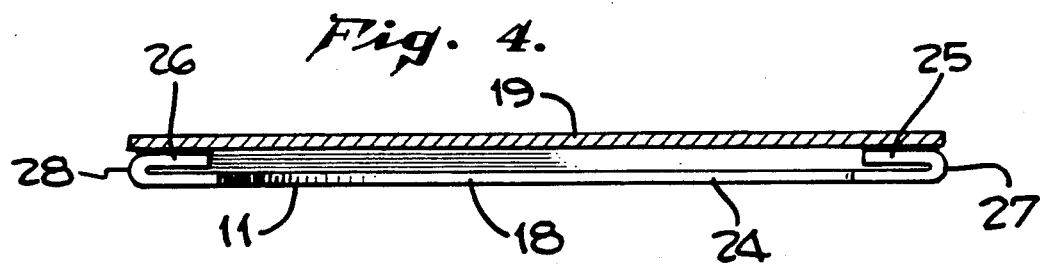
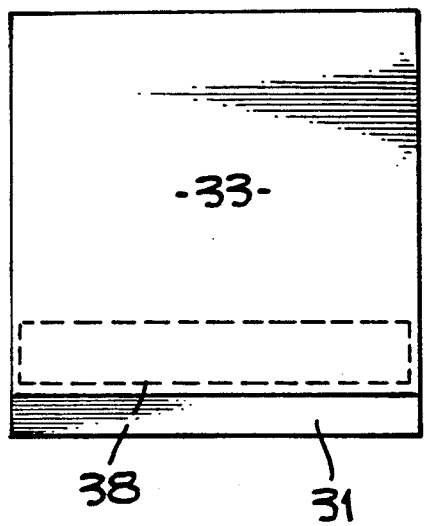
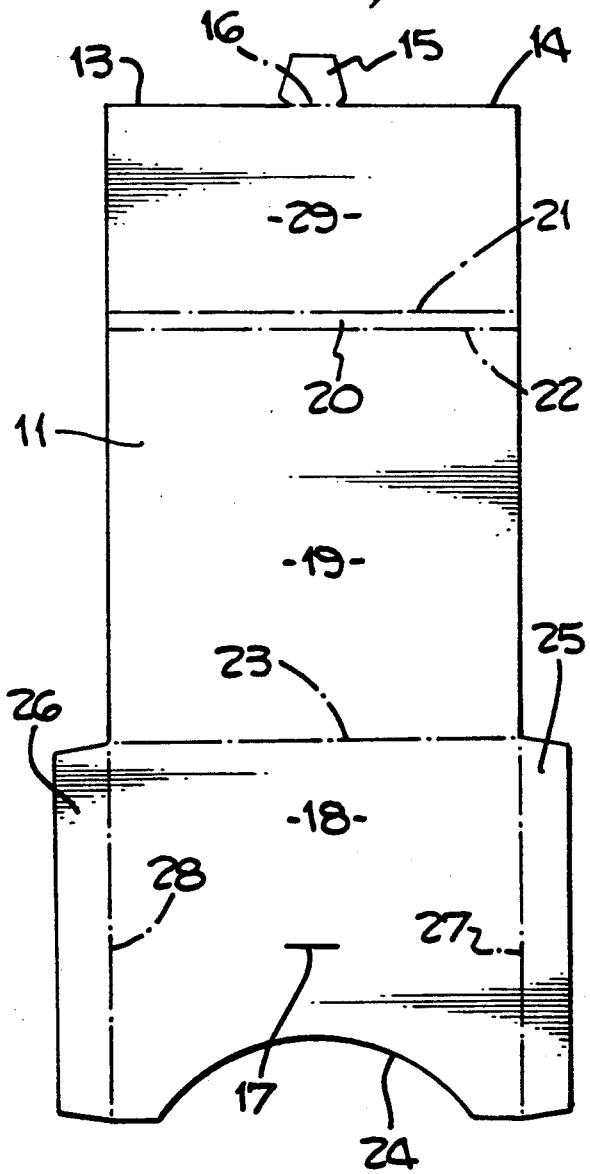
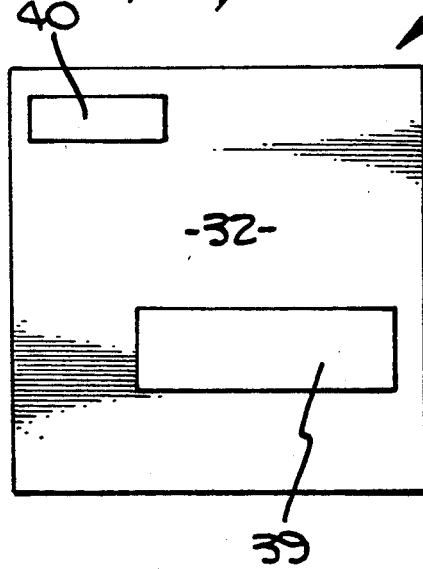

COMPACT DISC CASE AND BLANK FOR FORMING SAME

BACKGROUND OF THE INVENTION

1. Field of the Invention

The invention relates to compact disc cases; and, more particularly, to a combination compact disc storing and mailing case and blank for forming the same.

2. Description of the Prior Art

Compact audio discs (called CDs) are rapidly replacing vinyl records for a wide variety of reasons. However, present day CDs are stored in hard brittle plastic cases, called jewel boxes. The jewel box consists of two pieces of molded polycarbonate which are hinged along a common side to permit the opening of the box as one would open a book. A styrene tray with a center hub that engages the hole in the center of the CD is snap fit into one of the polycarbonate pieces. The jewel box is difficult to open, and it is difficult to remove the CD from the hub without bending the CD. Further, CDs are also rapidly replacing cassette tapes, particularly in vehicles, where the operator, who may be the driver, must remove the CD from the jewel box in a one handed operation. Such boxes, however, are difficult to open with one hand, are very fragile, resulting in easy breakage of the hinges holding the polycarbonate pieces together (which hinges do not give or flex). The boxes are also easily broken if dropped and, because of their materials and construction, are quite expensive to manufacture. This high cost has served to keep the retail costs of CDs quite high.

In addition to the foregoing, CDs are shipped to disc jockeys or the like for promotion and preview in such cases. The distributor of such free CDs is of course quite interested in reducing its costs. Cardboard cases have been used but have not been successful.

In U.S. Pat. No. 4,620,630 to Moss, a CD enclosure is disclosed which can be converted from a display mode (FIG. 2) to a storage mode (FIG. 4). No removable flap on which a mailing label may be placed is shown. In U.S. Pat. No. 4,850,731 to Youngs, a vinyl CD storage case is disclosed having a pocket for storing a CD. Again, no detachable portion on which a mailing label can be placed is disclosed.

There is thus a need for a combination CD storage and mailing case wherein a mailing label may be placed on a detachable portion of the case so that the detachable portion can be removed after receipt and the remainder of the case used as storage.

SUMMARY OF THE INVENTION

It is an object of this invention to provide a combination compact disc mailing and storage case with the mailing portion being detachable after receipt.

It is a further object of this invention to provide a blank for forming the aforementioned case.

It is still further an object of this invention to carry out the foregoing objects using inexpensive materials, such as cardboard, with few parts.

It is still further an object of this invention to provide a two-piece case for holding compact discs, one of the pieces being detachable from the other and discarded.

It is another object of this invention to carry out the foregoing object wherein mailing or advertising material may be placed on the discarded piece and the other piece having a pocket for receiving and storing the compact disc.

These and other objects are preferably accomplished by providing a compact disc case and blank for forming the same. The case includes a pocket inside of an envelope for holding a compact disc. A cut-out portion provides easy grasping of the disc to permit removal and insertion into the case. A flap folds over the cut-out portion providing a closable case for holding and storing the disc. The flap has a detachable folded portion which can be used to place a mailing label on, then folded over and about the case and sealed to provide a mailing container. The folded portion can then be detached and the case is used to permanently store the disc.

BRIEF DESCRIPTION OF THE DRAWING

FIG. 1 is a plan view of the compact disc case shown in the open position with a CD disposed therein;

FIG. 2 is a front elevational view of the case of FIG. 1 shown in the closed position with a portion thereof removed;

FIG. 3 is a view taken along lines 3—3 of FIG. 1;

FIG. 4 is a view taken along lines 4—4 of FIG. 1;

FIG. 5 is a front elevational view of the case of FIG. 1 shown in the closed position for display or mailing;

FIG. 6 is a back elevational view of the closed case of FIG. 5; and

FIG. 7 is a plan view of the storage portion 11 alone of the case of FIG. 1, the envelope portion of the case being shown in position prior to assembly.

DESCRIPTION OF THE PREFERRED EMBODIMENT

Referring now to FIG. 1 of the drawing, a combination compact disc storing and display or mailing case 10 is shown. Case 10 thus has a storage portion 11 and a detachable display or mailing portion 12. As will be discussed further, case 10 may be formed from a single planar blank and be of an inexpensive foldable material, such as cardboard. Thus, portion 11 is detachable from portion 12 along score lines 13, 14. Score lines 13, 14 do not extend all the way across; as seen, a tab 15 is connected to portion 11 along a fold line 16. When assembled, as seen in FIG. 2, tab 15, shown in dotted lines, is inserted through a slit 17 (see also FIG. 1) on the front wall 18 of the storage envelope portion of the case 10 (upper detachable portion 12 having been removed along score lines 13, 14 in FIG. 2). The envelope portion of case 10 is thus comprised of a front wall 18 and a back wall 19. As seen in FIG. 3, back wall 19 is connected to a hinge 20 which hinge 20 is connected, at fold lines 21, 22, to upper panel portion 29 of storage portion 11 and to back wall 19, respectively (see also FIG. 1). Walls 18, 19 may be one integral piece folded at the bottom at fold line 23. Wall 18 may also be lesser in overall height than wall 19 (see FIG. 1) having an arcuate cut-out area 24.

As seen in FIG. 4 (and as will also be explained further hereinbelow with regard to FIG. 7) front wall 18 has a pair of side flaps 25, 26, hinged to front wall 18 at fold lines 27, 28, respectively. Flaps 25, 26 are glued or otherwise secured to back wall 19 thus forming a pocket for receiving compact discs 30 between front and back walls 18, 19 and closed off on three sides. Further, as seen in FIG. 2, after removal of portion 12 by tearing it off along score lines 13, 14 and about flap 15, thus detaching it from panel portion 29, panel portion 29 is folded about hinge 20 and tab 15 is inserted into slit 17 forming the storage envelope of case 10. Panel portion 29 can be thus quickly and easily inserted, via tab 15, on to front wall 18 and disc 30 can be easily and quickly removed and replaced. The foregoing can be carried out one-handedly.

Indicia can be printed on the front of wall 18 and the back of wall 19, such as the artist, the songs on the disc, etc. A removable insert, if desired, can be placed into the pocket holding the disc 30, if desired, with further information, as desired. Also, the interior walls of the pocket holding CD 30 can be provided with any desirable chemically treated materials for protecting the disc 30.

The display portion 12 is one elongated planar member having three folded portions 31-33. Portion 31 is connected to panel portion 29 at score lines 13, 14 and about tab 15. Portion 31 is connected to portion 32 at fold line 34. Portion 32 is connected to hinge 36 at fold line 35 which hinge 36 is in turn connected to portion 33 at fold line 37. Finally, a removable adhesive strip 38 is provided at the upper end of portion 33 which may be peeled off to expose an adhesive surface as is well known in the art.

As seen in FIG. 5, case 10 is folded about hinge 20 and about fold line 34, and then about hinge 36 with portion 33 overlying portions 29 and 31. Portion 31 and interconnected portion 29 may be thus slightly greater in length than portion 33. The strip 38 is shown in dotted lines and is abutting against the portion 31. Strip 38 can now be peeled off and the portions 31, 33 sealed together for mailing or display. Of course, any suitable sealing means may be used, such as tape. Finally, as seen in FIG. 6, one or more labels 39, 40 may be glued or otherwise secured to the back of portion 32 providing mailing and shipping information or advertising or other promotional information. Of course, certain information, such as the source of the case 10 which may be printed on label 40, may be printed directly on portion 32.

It can thus be seen that there is provided a case which can be shipped to a recipient, or displayed in a store of the like, then, after receipt or purchase, the recipient can detach portions 31, 33 (FIG. 5), open the case and detach display portion 12 from storage portion 11 along score lines 13, 14 and flap 15. Storage portion 11 can then be used to permanently store the compact disc 30.

Prior to assembly into the position shown in FIG. 1, the storage portion 11, as seen in FIG. 7 (shown detached from display portion 12 for convenience of illustration), is open along fold line 23 with flaps 25, 26 also shown in an unfolded position prior to assembly and gluing. Thus, it can be appreciated that case 10 can be formed from a single blank of planar material, such as cardboard. Storage portion 11 is quickly and easily folded to form the envelope shown in FIG. 1 by folding flaps 25, 26 inwardly (or over on top of wall 18 as seen in FIG. 7), glue is provided along flaps 25, 26, then the folded flaps 25, 26 and interconnected front wall 18, is folded along fold line 23 over and on top of wall 19 to form the envelope shown in FIG. 1 as previously discussed. The only addition to display portion 12 would be the provision of an adhesive surface as indicated by provision of strip 38.

There thus is disclosed a blank for forming case 10. Although cardboard is preferred for low cost and ease of assembly, obviously other materials, such as flexible plastics, may be used. Indicia may also be provided along the exposed outside of hinge 20, which forms a spine for the storage portion 11, to provide for indexing and the like, since the entire case 10, when assembled for shipping as shown in FIGS. 5 and 6, is lower in weight than conventional jewel boxes, it is cheaper to ship. After receipt, the shipping information or generic company markings, can be torn off at score lines 13, 14 and about tab 15, and tab 15 is merely tucked into slit 17 to provide a permanent storage case with indicia on the spine (hinge 20) and outside wall 19. The storage portion 11 is easily opened and re-closed. Although a particular embodiment of the case and blank is disclosed, variations thereof may occur to an artisan and the scope of the invention is to be limited only by the scope of the appended claims. The dimensions chosen may vary but are preferably chosen for conventional 4 ⅜" diameter compact discs and, thus, is preferably only slightly grater than the disc diameter. For example, when in the FIG. 5 position, the folded case 10 may be about 5" in length and width and only about 3/16" in thickness. Of course, compact discs or even laser discs of different diameters may be enclosed in larger cases made in accordance with the teachings of my invention.

I claim:

1. A combination storage and display case for compact discs comprising:
    a storage portion detachably attached to a display portion, the display portion being foldable about the storage portion along tearing line means whereby said storage portion can be detached from said display portion by tearing along said tearing line means, the storage potion having a front wall hingedly connected along the bottom and sides thereof to a back wall forming a pocket open at the top for receiving a compact disc therein between the front and back walls, the back wall of said storage portion being hingedly secured to a hinge, said hinge being hingedly secured to a panel portion detachably connected to said display portion along said tearing line means thereby detachably connecting said storage portion to said display portion, said panel portion being detachably connected to said display portion by a pair of score lines extending on each side of a tab integral with said panel portion and unconnected to said display portion.

* * * * *